United States Patent [19]

Divjak

[11] Patent Number: 5,444,644

[45] Date of Patent: Aug. 22, 1995

[54] AUTO-CONFIGURED INSTRUMENTATION INTERFACE

[75] Inventor: August A. Divjak, Waukesha, Wis.

[73] Assignee: Johnson Service Company, Milwaukee, Wis.

[21] Appl. No.: 187,922

[22] Filed: Jan. 27, 1994

[51] Int. Cl.[6] ............................................. G05B 23/02
[52] U.S. Cl. ................................. 364/550; 364/152;
364/141; 364/580; 364/186; 364/187; 364/579;
324/602; 395/284
[58] Field of Search ............... 364/152, 141, 483, 579,
364/580, 186, 187; 324/602, 130, 764; 395/325;
340/636; 379/58

[56] References Cited

U.S. PATENT DOCUMENTS

| | | | |
|---|---|---|---|
| 4,028,507 | 6/1977 | Hoppough | 324/602 |
| 4,942,358 | 7/1990 | Davis et al. | 324/764 |
| 5,153,510 | 10/1992 | Kominsky | 324/130 |
| 5,182,546 | 1/1993 | Shinbori et al. | 340/636 |
| 5,265,150 | 11/1993 | Helmkamp et al. | 379/58 |
| 5,309,569 | 5/1994 | Warchol | 395/325 |

Primary Examiner—Ellis B. Ramirez
Assistant Examiner—Thomas Peeso
Attorney, Agent, or Firm—Joseph E. Root, III; Leonard J. Kalinowski; E. L. Levine

[57] ABSTRACT

An instrumentation interface circuit controlled by a microprocessor of a data acquisition system enables identification of the type of input/output devices that are connected to its inputs through a systematic analysis of the characteristics of the connected devices, the systematic analysis including monitoring the current through and the voltage across the devices as different drive signals are applied to the connected devices, the interface circuit including a conditioning circuit having a drive circuit which is controlled by the microprocessor for providing the drive signals, a current sensing circuit for sensing the load current flowing through the connected device, a voltage sensing circuit for sensing the voltage across the connected device, and a switchable feedback circuit which is controlled by the microprocessor to selectively feed back the load current or the sensed voltage to the input of the drive circuit to establish the drive signals for the connected device.

21 Claims, 5 Drawing Sheets

AUTO-CONFIGURED INSTRUMENTATION INTERFACE

BACKGROUND OF THE INVENTION

This invention relates to data acquisition systems, and more particularly to an instrumentation interface circuit for such systems which automatically configures a plurality of input and output devices with a microprocessor of a data acquisition system which monitors and/or controls the input and output devices.

Environmental control systems, surveillance systems, industrial control systems and the like, employ a plurality of different types of transducers including input devices that are monitored by a microprocessor to determine control functions that must be initiated and output devices that are controlled by the microprocessor to implement the control functions that are required. These input and output devices can be classified into four general categories, namely internally sourced input devices, internally sourced output devices, externally sourced input devices and externally sourced output devices. Internally sourced input devices include RTD temperature sensors, pressure transducers, potentiometers and dry contact inputs. Internally sourced output devices include transducers requiring a 4 to 20 milliamp output or 1 to 10 volt output and include momentary relays and latching relays. Externally sourced input devices are configured to provide 4 to 20 milliamp current inputs and 1 to 10 volt inputs to the interface circuit. Externally sourced output devices are configured to modulate a power source to conduct 4 to 20 milliamps.

Because each of these input and output devices has different characteristics, an instrumentation interface must be provided between the input and output devices and the microprocessor which monitors and controls the input and output devices. Typically, such instrumentation interface includes a plurality of analog to digital converters, a plurality of digital to analog signal converter/driver circuits and a plurality of conditioning circuits, including a conditioning circuit individually associated with each input/output device and adapted to the characteristics of the associated input/output device. The input and output devices are connected to the associated conditioning circuit which is interposed between the device and an analog to digital converter when the connected device is an input/type device and which is interposed between the device and a digital to analog signal converter/driver circuit when the connected device is an output type device. The analog to digital converter with its associated conditioning circuit converts input signals, or indications such as contact closures, into a digital sense signals for use by the microprocessor. The digital to analog signal converter/driver circuit responds to digital control signals provided by the microprocessor to provide suitable drive signals via the associated conditioning circuit for the output device connected to the conditioning circuit.

Typically, the data acquisition system includes a multiplexing arrangement which permits several of the same type of input devices to use a common analog to digital converter. However, a separate conditioning circuit has to be provided for each device because the conditioning circuit must be specific to the type of input/output device that is connected to the conditioning circuit. For example, the conditioning circuits that are connected to current input devices, must include current detecting means, and the conditioning circuits that are connected to voltage input devices must include a voltage detecting means. Similarly, each output device requires a separate digital to analog/driver circuit because the digital to analog driver circuit must be matched to the device that it drives. Accordingly, because of the large number of input/output devices employed in a data acquisition system, many different types of conditioning circuits and driver circuits must be provided to properly interface the different types of input/output devices with the microprocessor. Consequently, considerable planning is required in the layout and installation of the data acquisition system because of the need to associate the large number of input and output devices with their conditioning circuits in making the connections of each input/output device to its designated conditioning circuit.

SUMMARY OF THE INVENTION

The present invention provides an auto-configured instrumentation interface circuit for a data acquisition system which monitors and/or controls a plurality of input/output devices, which may include internally sourced output devices, internally sourced input devices, externally sourced output devices and externally sourced input devices. During installation and/or initialization of the data acquisition system, the instrumentation interface circuit is controlled by a microprocessor of the data acquisition system to automatically determine the type of input/output device that is connected to its inputs through a systematic analysis of the characteristics of the connected device or devices, and provides the proper input or output to each of the connected devices.

The instrumentation interface circuit includes an analog to digital converter, a digital to analog converter and conditioning circuit means which are controlled by a microprocessor of the data acquisition system. The conditioning circuit means includes input means, current monitoring means and voltage monitoring means. The input means provides terminations for at least one connected input/output device. The current monitoring means and the voltage monitoring means provide inputs to the analog to digital converter corresponding, respectively, to the current flowing through and the voltage across the connected device.

In carrying out the systematic analysis, the microprocessor causes each connected input device to be energized in a predetermined sequence while monitoring the output of the voltage monitoring means and of the current monitoring means to identify the device as a voltage input or current input type device, a voltage output or current output type device or as a resistance type device. During the systematic analysis, a voltage that is proportional to the sensed voltage is fed back to the drive circuit while monitoring the current flowing through and the voltage across the connected device, and a current that is proportional to the current flowing through a load is fed back to the drive circuit while monitoring the current through and the voltage across the connected device. The systematic analysis is carried out in a preestablished sequence of steps, and involves selecting whether voltage or current is fed back while controlling the digital to analog converter to cause the signal output provided by the driver circuit to produce a measurable output condition for the connected device that is indicative of the type of device that is connected to the conditioning circuit. In accordance with a disclosed embodiment, first a determination is made as to whether or not the connected device is an output device. This determination includes distinguishing between voltage and current output type devices. Then, a determination is made as to whether the device is an input device, including distinguishing between voltage input, current input and resistance type devices. The resistance determination includes identifying the specific type of resistance device, such as an RTD sensor, a potentiometer, or an open contact or a closed contact, by discriminating between ranges of resistance values measured.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF A PREFERRED EMBODIMENT

Figure 1:
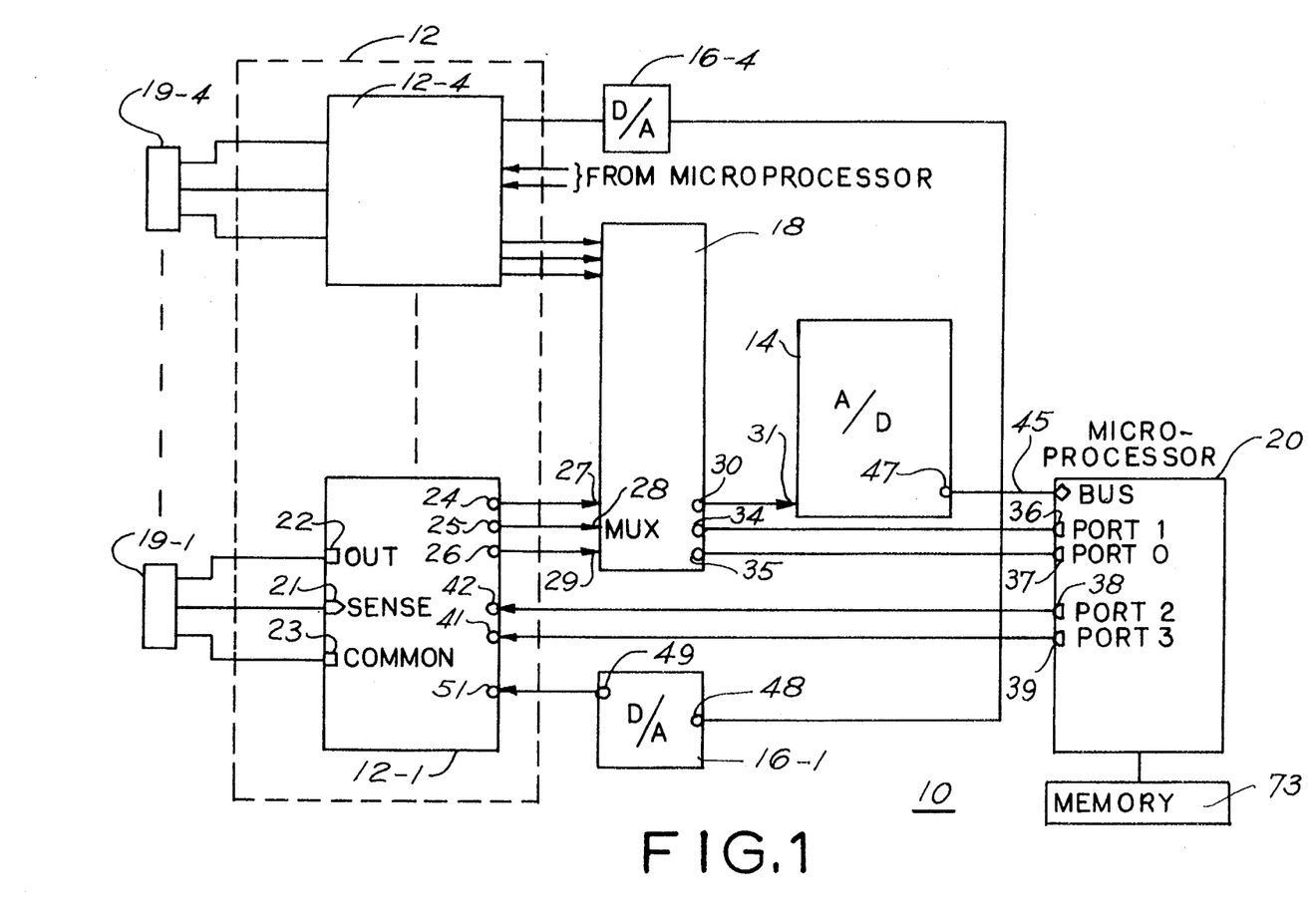
FIG. 1 is a block diagram of an instrumentation interface circuit provided by the present invention.

Referring to the FIG. 1 of the drawings, the instrumentation interface circuit 10 provided by the present invention includes conditioning circuits 12-1 to 12-4, an analog to digital converter 14, digital to analog converters 16-1 to 16-4, and multiplexing circuit 18. Typically, the components of the interface circuit 10 are mounted on a printed circuit board (not shown). The components of the interface circuit 10 are controlled by a microprocessor or signal processing circuit 20 of a data acquisition system during installation and/or initialization of the system to identify one or more universal input/output devices that are connected to the interface circuit. By way of example, the interface circuit 10 may include four conditioning circuits 12-1 to 12-4, one analog to digital converter 14, four digital to analog converter circuits 16-1 to 16-4, and an eight channel multiplexing circuit 18, with the conditioning circuits 12-1 to 12-4 being adapted to provide connections to any combination of four input devices or output devices 19-1 to 19-4. By universal input/output device is meant that the four connected devices for any one of the interface circuits can be voltage input devices, current input devices, voltage output devices, current output devices, or a mixture of these types of devices.

Each of the conditioning circuits, such as conditioning circuit 12-1, has a sense input terminal 21, an output or source terminal 22, and a common terminal 23 which provide connections for its associated field device or input/output device 19-1. The field connections are terminated by at least three wire connections to cover most input type devices and at least two terminations for output type devices. The conditioning circuit 12-1 has three output terminals 24, 25 and 26 which are connected to respective inputs 27, 28 and 29 of the multiplexing circuit 18. The multiplexing circuit 18 has an output 30 connected to an input 31 of the analog to digital converter 14 and two channel select inputs 34 and 35 which are connected to output ports 36 and 37 of the microprocessor 20. The microprocessor has further output ports 38 and 39 which are connected to a gain control input 42 and a feedback select input 41, respectively, of the conditioning circuit 12-1. The processing circuit is connected to a data output 47 of the analog to digital converter 14 and to a data input 48 of the digital to analog converter 16-1 via data bus 45. The digital to analog converter has an output 49 which is connected to an input 51 of the conditioning circuit 12-1.

The interface circuit 10, under the control of the microprocessor, determines the type of devices 19-1 to 19-4 that are connected to its input terminals 21–23 and provides the proper input or output to the connected devices 19. When a connected device is identified as being an input type device, the interface circuit acts as a voltage sensing circuit or a current sensing circuit depending upon whether the connected device is identified as a voltage or current type device. Similarly, the interface circuit provides a voltage or current drive signal to the connected device depending upon whether the connected device is identified as a voltage or current type device. The interface circuit determines the type of device that is connected to its input terminals by analyzing the characteristics of the device using a systematic analysis of the voltage across and the current through the device.

The interface circuit identifies four types or categories of devices involved, namely, internally sourced input devices which provide an input to the interface circuit, internally sourced output devices which receive a drive output from the interface, externally sourced input providing devices and externally sourced output devices which receive an input from the interface circuit. Internally sourced input providing devices include RTD temperature sensors, pressure transducers, potentiometers and dry contact inputs. The internally sourced output devices include transducers requiring a 4 to 20 milliamp output or 1 to 10 volt output and include momentary relays and latching relays. Externally sourced input providing devices are configured to provide 4 to 20 milliamps current inputs and 1 to 10 volt inputs to the interface circuit. Externally sourced output devices are configured to modulate a power source to conduct 4 to 20 milliamps. Such systems employ a plurality of different types of transducers including input devices, such as RTD temperature sensors, humidity sensors, pressure transducers, smoke stack temperature transmitters, potentiometers, relays providing indications via contact closures, and other devices for providing an outputs that are indicative of conditions being monitored. The systems also include a plurality of output devices, such as fan speed controllers, proportional controllers, relays, solenoid operated valves, etc., which are controlled to carry out desired functions.

Figure 2:
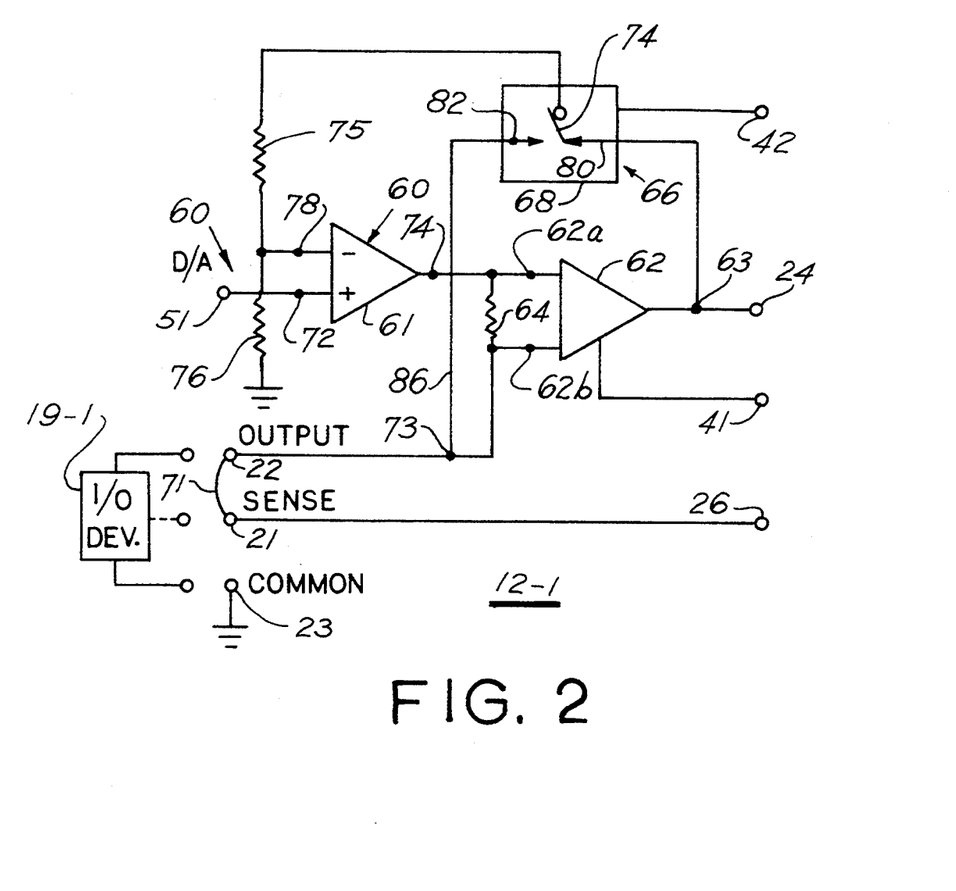
FIG. 2 is a simplified schematic circuit diagram of the conditioning circuit of the instrumentation interface circuit shown in FIG. 1.

Referring to FIG. 2, which is a simplified schematic circuit diagram of the conditioning circuit 12-1 of the instrumentation interface circuit, the conditioning circuit 12-1 comprises a drive circuit 60 including a differential amplifier 61, an instrumentation amplifier 62, a resistor 64, and a switchable feedback circuit 66. The switchable feedback circuit 66 is represented by a double pole single throw switch 68 which is operated by a microprocessor generated control signal supplied to the switch 68 on input 42.

The non-inverting input 72 of the differential amplifier 61 is connected to terminal 51 which is connected to the output 49 of the digital to analog converter 16-1. The output 74 of the drive circuit 60 is connected through resistor 64 to terminal 22. In FIG. 2, terminal 22 is shown connected to the sense terminal 21 by a link or jumper 71. The link 71 is installed by the field personnel, depending on the type of input/output device that is connected to the conditioning circuit 12-1.

The resistor 64 is connected across the inputs 62a and 62b of the instrumentation amplifier 62. The resistor 64 has a low resistance value, 15 ohms, in the exemplary embodiment. The resistance value of resistor 64 is selected to be low enough to enable a desired current level to be established through the circuit from the output of the drive circuit 60 to the input terminal 22 and through the connected device, but to be high enough to protect circuit devices from excess current.

The output 63 of the instrumentation amplifier 62 is connected to terminal 24 which is connected to input 27 of the multiplexing circuit 18 to provide a current input to the analog to digital converter. The sense input terminal 21 is connected to at terminal 26 to input 29 of the multiplexing circuit 18 to provide a voltage input to the analog to digital converter that corresponds to the sensed voltage $V_s$ that is provided at terminal 21.

Referring to the switchable feedback circuit 66, the switch 68 has a switch arm 74, a pole 80 connected to the output 63 of the instrumentation amplifier 62 and a pole 82 connected to the terminal 22 via conductor 86. The switch arm is connected to ground through series connected resistors 75 and 76. The inverting input 78 of the differential amplifier of the drive circuit 60 is connected to the junction of resistors 75 and 76. The value of resistor 75 is twice the value of resistor 76 so that under voltage feedback conditions, the voltage supplied to the inverting input of the differential amplifier 61 of drive circuit 60 is one-third the value of the sensed voltage. The relative values of the resistors 75 and 76 provide a gain of three for the differential amplifier.

The switchable feedback circuit 66 provides feedback of the voltage $V_s$ sensed at terminal 22 to the inverting input of the differential amplifier of the drive circuit 60 when the switch arm 74 is operated to engage pole 82. The switchable feedback circuit 66 provides feedback of current proportional to the load current $I_L$ from the output of the instrumentation amplifier 62 to the inverting input of the differential amplifier 61 when the switch arm 74 is operated to the position illustrated in FIG. 2 to engage pole 80. The current fed back corresponds to the load current, i.e., the current flowing through resistor 64 from the differential amplifier 61, which has a gain of three, as amplified by the instrumentation amplifier. When current feedback is being provided to the differential amplifier 61, the effective value of resistor 64 as seen by the differential amplifier is five ohms.

The microprocessor 20 is programmed to analyze the devices 19-1 to 19-4 which are connected to the inputs of the interface circuit 10 to identify the device type by determining the device is sourced internally or externally and by monitoring the response of the connected device under current and voltage feedback conditions for each connected device. The microprocessor goes through an evaluation to test first if a connection has been made to the conditioning circuit input or output terminals, and if so to then determine the type of device that is connected to the conditioning circuit. The interface circuit 10 measures the voltage $V_s$ at terminal 22 relative to ground or the common reference and the current flowing through the resistor 64, which corresponds to the current that is being supplied to the device 19-1 connected between terminal 22 and the ground terminal 23. The voltage and current values are read by the microprocessor 20 via the analog to digital converter circuit. During the analyzing sequence, the microprocessor 20 controls the switchable feedback circuit 66 to select voltage and/or current feed back to the drive circuit 60. The microprocessor 20 also controls the gain of the instrumentation amplifier circuit to control resolution by providing a large dynamic range for measurement of the sensed voltage and/or load current. The drive circuit 60 is embodied as a differential amplifier, but other types of summing or combining circuits may be used to combine the control signal provided by the microprocessor with the feedback signal provided by the feedback circuit 66.

Figure 3:
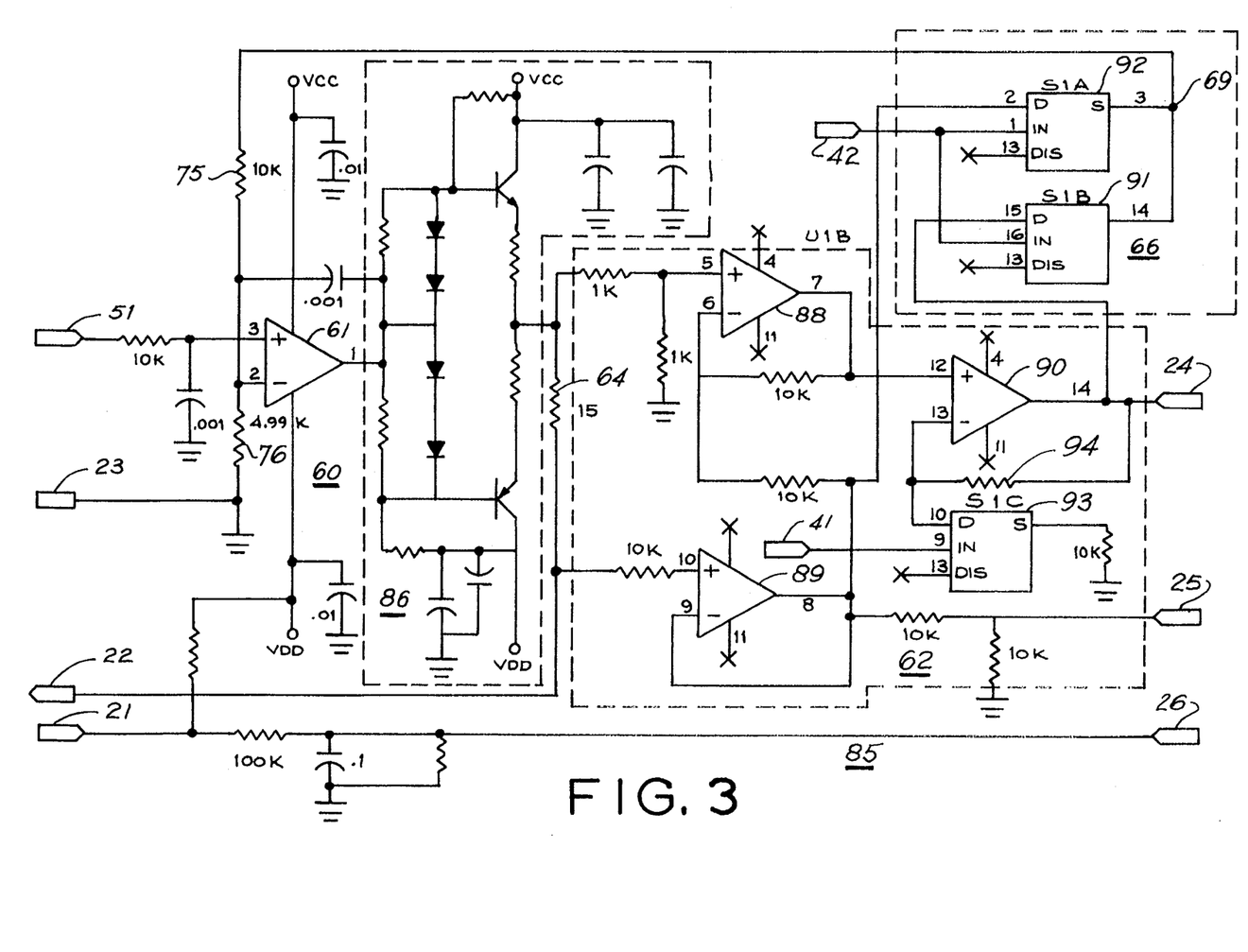
FIG. 3 is a detailed schematic circuit diagram of the conditioning circuit.

Referring to FIG. 3, there is a detailed schematic circuit diagram of one an implementation of the conditioning circuit 12 shown in FIG. 2. The conditioning circuit shown in FIG. 3 has been given the reference numeral 85 and components of the conditioning circuit 85 have been given the same reference numerals as corresponding components of the conditioning circuit 12 shown in FIG. 2. The conditioning circuit 85 includes a power amplifier stage 86 which is interposed between the output of the differential amplifier and the load resistance 64. The instrumentation amplifier 62 comprises three operational amplifiers 88, 89 and 90. Also, the feedback selector switch 68 is implemented as a pair of latch circuits 91 and 92, latch circuit 91 being interposed between the output of the instrumentation amplifier and the inverting input of the differential amplifier 61 and the latch circuit 92 being interposed between the output of amplifier 89, which provides an output that is proportional to the sensed voltage $V_s$ and the inverting input of the differential amplifier 61. Also, the instrumentation amplifier includes a latch circuit 93 that is associated with the output stage operational amplifier 90 and is enabled by a control signal applied to gain control input 42 by the microprocessor to connect a resistor 94 in circuit with the gain control feedback loop of the amplifier 90, to change the gain of the instrumentation amplifier when greater resolution is required. The operation of the conditioning circuit is readily understood from the foregoing description of the conditioning circuit 12-1, and accordingly will not be described herein.

TABLE 1 illustrates the types of input and output configurations which can be accommodated by the interface circuit by selecting voltage and current feedback along with values for the signal output of the digital to analog converter 16 which is supplied to the drive circuit 60.

Figure 4:
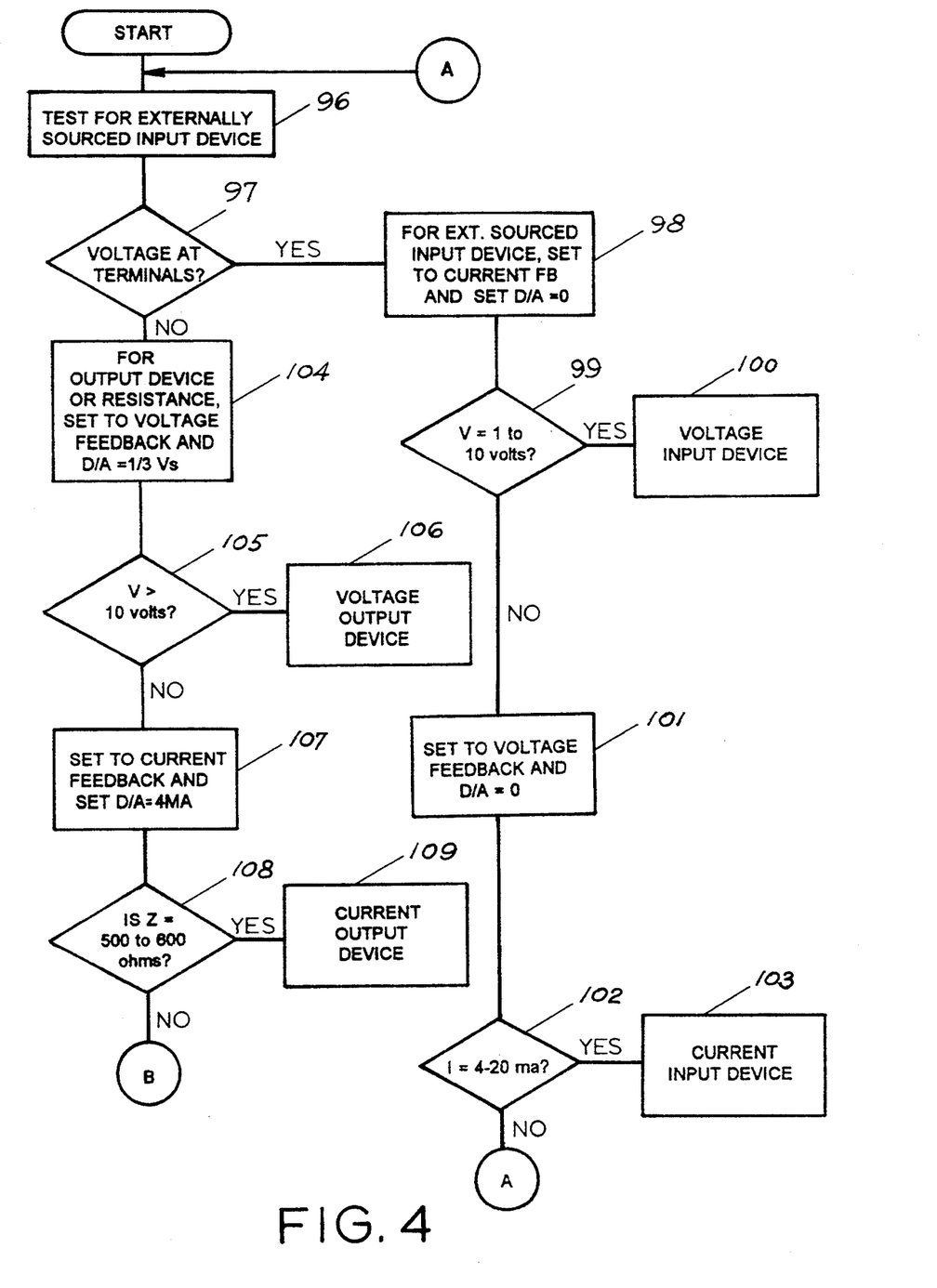
FIGS. 4 and 4A are a process flow chart illustrating the process of identifying universal input/output devices that are connected to the interface circuit provided by the present invention; and, FIG. 5 is a waveform of the drive signal for a relay that is connected to the interface circuit as an output device, illustrating the pick-up voltage and the drop out voltage for the relay.
Figure 4A:
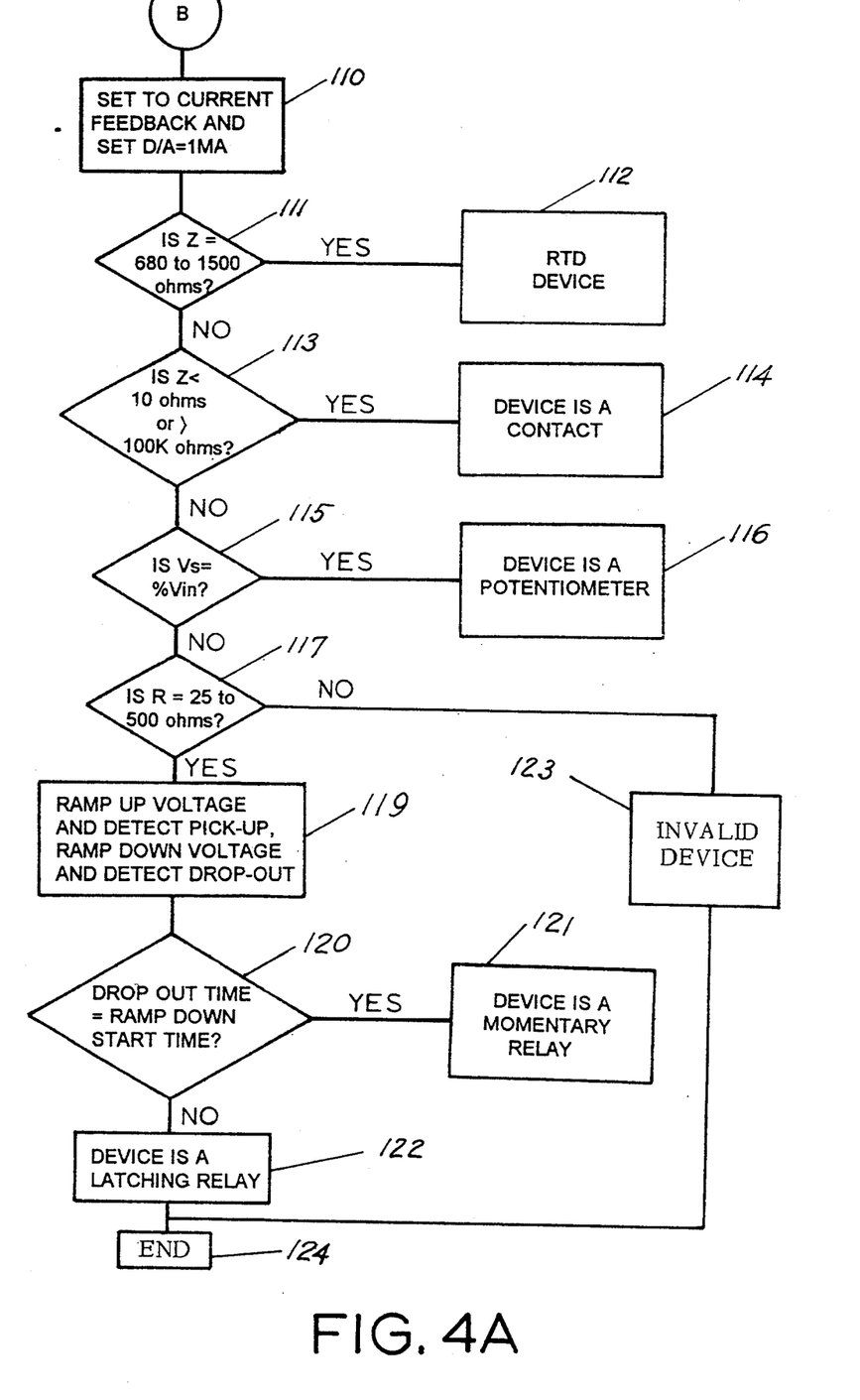

For purposes of illustration of the operation of the interface circuit, it is assumed that the microprocessor operates in the manner set forth in the process flow chart given in FIGS. 4 and 4A. It is assumed that terminals 21 and 22 are interconnected by link 71. The microprocessor is programmed to sequentially test for the presence of a voltage input device or voltage output device, a current input device or a current output device, and a resistance device, such as an RTD temperature sensor, a potentiometer or a contact input. The microprocessor 20 is programmed to determine the ratings and type, i.e., a momentary or a latching relay, for a relay having its operate winding connected across the terminals 22 and 23. The disclosed sequence of testing operations is provided by way of example, and other test operation sequences may be used, for example, testing first for resistance type devices, or testing first for current input or output type devices, etc.

Referring to FIG. 1, before starting the test sequence to identify the device connected to each set of input terminals of the interface circuit 10, the microprocessor determines whether or not devices are connected to the sets of input terminals of the interface circuit 10, as well as to the sets of input terminals of all other interface circuits of the data acquisition system. During installation and/or initiation of the data acquisition system, all of the connected devices are routinely activated by personnel installing the system, creating detectable changes in the status or condition of the point. The microprocessor routinely looks at all points and stores an indication in a memory 73 of the microprocessor if there is a change in the status or condition of a point, i.e., a change in the potential of a source terminal 22 relative to ground terminal 23, a change from an open circuit condition to a closed circuit condition, etc., the latter change indicating that the point, i.e. the connected device, is a relay contact. If a device other than a normally open relay contact is connected to the set of inputs, the device can be identified by the interface circuit 10, under the control of the microprocessor, by the systematic analysis of its response to impressed voltage and/or current conditions as will be shown. If there is no change in the status of the point indicative that the point is always "open", this is an indication that there is no device connected to that particular set of input terminals.

Referring additionally to FIG. 2, and to the process flow chart given in FIGS. 4 and 4A, in the exemplary test sequence, at block 81, the microprocessor initially configures the conditioning circuit 12-1 to test for an externally sourced input type device. The microprocessor provides a control signal on channel select input 35 to connect the voltage sensed input at terminal 26 to the input of the analog to digital converter 14. At decision block 97, the microprocessor monitors the output of the analog to digital converter to test for the presence of a voltage at the sense terminal 21. If a voltage is present on the voltage sense input, the device is an externally sourced input device and a determination is made as to whether the device is a voltage or current input type device.

At block 98, the microprocessor provides a control signal on the feedback select input 41 of the switch 68 to cause the switch to connect output 63 of the instrumentation amplifier to the inverting input 78 of the differential amplifier 61, providing current feedback to the input of the drive circuit 60. Also, the microprocessor provides a control signal on select input 35 of the multiplexing circuit 18 to connect terminal 26, and the sense terminal 21, to the input of the analog to digital converter 14, for monitoring the sensed voltage $V_s$ provided across the terminal 21 relative to ground. The microprocessor provides an output via data bus 45 to the input of the digital to analog converter 16 (FIG. 1), setting the output of the digital to analog circuit to zero causing the output of the differential amplifier to zero, resulting in no current flowing through the load resistor 64 to terminal 21. Thus, the differential amplifier output provides a high output impedance to the load, including resistance 64 and the connected device 19. At decision block 99, the microprocessor reads the output of the analog to digital converter and if the output is a voltage in the range of 1 to 10 volts, the connected device 19 has been identified as being a voltage input type device, block 100. Otherwise, a test is made to determine if the device is an externally sourced current input device.

At block 101, the microprocessor sets the switch 68 to provide voltage feedback to the inverting input of the differential amplifier 61 and provides a control signal to channel select input 34 of the multiplexing circuit 18 to cause the output of the instrumentation amplifier to be connected to the input of the analog to digital converter. Also, the microprocessor sets the output of the digital to analog converter to zero, causing the differential amplifier to provide a zero current output. With voltage feedback to the differential amplifier, a virtual ground is provided at the output of the drive circuit 60. If the connected device is an externally sourced current input device, current will flow through the load resistor 64 from terminal 22 to the output of the drive circuit. This current is detected by the instrumentation amplifier 62 so that current is provided to terminal 24. The output of the analog to digital is monitored by the microprocessor and if the current is in the range of 4–20 milliamps, block 102, the connected device has been identified as being an externally sourced current input device, block 103.

Referring back to decision block 97, if no voltage is sensed at the sense terminal 21, the connected device is not an externally sourced input type device and so at block 104 the microprocessor configures the conditioning circuit to test for a voltage or current output device or a resistance type device. For this portion of the test sequence, the microprocessor sets the feedback select switch 68 to provide voltage feedback to the differential amplifier and provides a control signal on the channel select input 35 of the multiplexing circuit 18 to connect terminal 26 to the input of the analog to digital converter 14, for monitoring the sensed voltage $V_s$. The microprocessor sets the digital to analog converter to provide a voltage corresponding to the feedback voltage, i.e., one-third the sensed voltage, so that the drive circuit 60 supplies a current of approximately 1 milliamp through the load resistor 64. The current flowing through the load resistor, and thus through the connected device 19, is monitored by the instrumentation amplifier 62. If the sensed voltage $V_s$ is greater than 10 volts, then at decision block 105, the connected device has been identified as being a voltage output type device, block 106. If not, a test sequence is carried to attempt to identify the device as a current output type device.

If the voltage is not greater than 10 volts, a test is made to determine if the connected device is a current output device. At block 107, the microprocessor sets switch 68 to provide current feedback to the drive circuit 60 and controls the digital to analog converter to provide an output current that is proportional to the load current $I_L$, and a factor which takes into account the gain of the differential amplifier 61. This current is represented by the relationship $I_L * A_v * 5$, where $A_v$ is the gain of the differential amplifier 61, which is three in the exemplary embodiment and the constant "5" is selected to make the load resistance 64 appear to have an effective value of 5 ohms. The current causes the driver circuit to provide a 4 milliamp current through the load resistor 64 to sense terminal 21 which is verified by monitoring the output of the analog to digital converter to confirm that the load current is 4 milliamps. Then the sensed voltage $V_S$ is monitored. If, at decision block 108, the voltage sensed is that provided for a load impedance on the order of 500 to 600 ohms when a 4 milliamp current is flowing in the load circuit, the connected device has been identified as being a current output device, block 109. If not, the connected device is a resistance type device or relay contact, and tests are carried out to determine the type of resistance device.

At block 110 the microprocessor sets switch 68 to provide current feedback and sets the digital to analog converter to cause a 1 milliamp current to flow through the load resistor 64 to terminal 22. Then, the voltage output of the analog to digital converter is compared with a reference value, at decision block 111, to determine if the impedance of the device is in the range of approximately 680 ohms to 1500 ohms. If so, the device is a RTD temperature sensor as indicated at block 112. If not, a comparison is made at block 113 to determine if the impedance is less than about 10 ohms or greater than approximately 100K ohms. If so, the device 19 is a contact input as indicated at block 114.

If the voltage $V_S$ is a percent of the input voltage and the impedance is in the range of approximately 100 to 5000 ohms, the connected device 19 is identified as being a potentiometer. When the connected device is a potentiometer, the tap of the potentiometer is connected to the sense terminal 21 and the resistance portion of the potentiometer is connected between terminals 22 and 23. Thus, the link 71 is not provided between the source terminal 22 to the sense terminal 21. Therefore, if at decision block 115 the sensed voltage $V_S$ is determined to be a percent of the input voltage, the connected device is identified as being a potentiometer as indicated at block 116.

Figure 5:
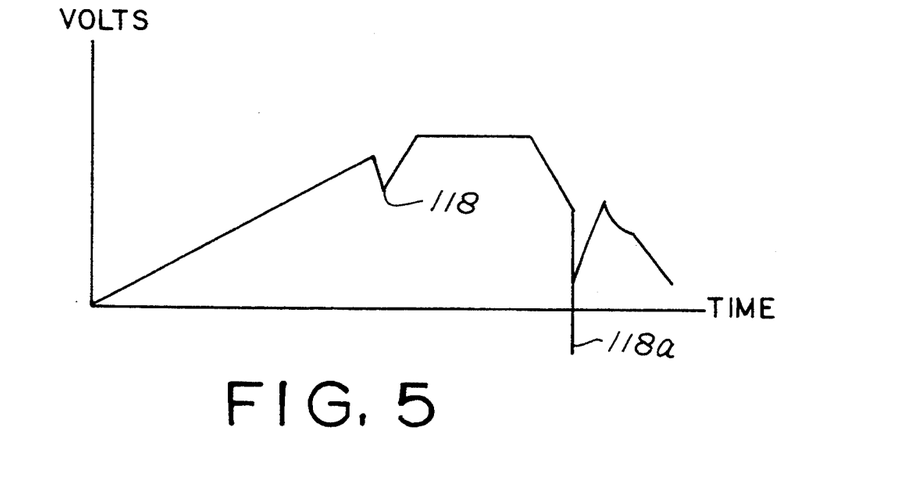

If the impedance is in the range of approximately 25 to 500 ohms and is slightly inductive, the connected device 19 is identified as being a relay, block 117. If the connected device is the operate winding of a relay, a detectable spike 118 will be produced in the sensed output voltage when the relay operates, as is shown in FIG. 5. If the device is identified as being a relay, a test is made to determine if the relay is a momentary relay or a latching relay. To test for the relay type, the microprocessor controls the digital to analog convertor to energize the drive circuit 60 to provide a drive current (or voltage) that ramps up to a maximum value while monitoring the load voltage (or current). If the connected device is identified as the operate winding of a relay, a determination is made as to whether the relay is a momentary relay or a latching relay. To this end, the microprocessor controls the digital to analog converter 18 to cause the drive circuit 60 to provide a drive signal that ramps up to energize the relay and ramps down to deenergize the relay, at block 119. When the relay operates, the spike 118 is produced in the output voltage indicating the turn on voltage for the relay. When the drive signal is ramped down, a further spike 118a is produced when the relay releases. For a momentary relay, the spike 118a is produced as soon as the drive voltage begins to decrease. If this is detected at decision block 120, it has been determined that the device is a momentary relay as indicated at block 121. However, for a latching relay, no spike is produced until the current polarity is reversed, producing the second spike 118a. If such a spike is detected when ramping down the current, it has been determined that the device is a momentary relay as indicated at block 122. If no spike is detected until the current is ramped in the opposite direction, it is determined that the device is a latching relay. Thus, a determination of whether the relay is a momentary relay or a latching relay can be made by observing the polarity required to release the relay because the polarity required to release the relay indicates whether the relay is a momentary relay or a latching relay.

If the device fails to meet any of the test criteria, it is assumed that the device is not a valid input/output type device and the select routine is ended and an indication is provided that no valid input/output device is connected to the conditioning circuit being analyzed. In all of the test sequences, the ranges of voltage, current and resistance can be tested using case statements of the program or in any other suitable manner such as using table look-ups, etc. One example of an impedance determination subroutine is given by the source code provided in Appendix 1.

After the type of each input/output device connected to the interface circuit has determined through the systematic analysis of the characteristics of the connected device or devices, information relating to the identification and operating characteristics of the devices is stored in memory by the microprocessor to enable the microprocessor to provide the proper input or output to each of the connected devices. That is, input type devices are configured to be connected to the analog to digital converter, output type devices are configured to receive an output via a digital to analog converter, etc. After the types of devices have been established, the voltage and/or currents are continually monitored by the microprocessor for diagnostic evaluation as well as reporting on the input and/output values. The configuration information derived is stored in memory and the point interface continues in the configured mode until an error is detected. This error would indicate some type of fault condition or a change in a connected device. The system would then go through another configuration operation sequence, performing a systematic analysis of the characteristics of the connected device or devices to determine the new point type or the type of fault encountered. Such systematic analysis can be carried out periodically or only in response to the detection of an error condition.

APPENDIX I

```
DETZ:
    SELECT CASE FZ
    CASE IS > 50000!
        IF AST <>7 THEN ERRFG = 1
        ACT = 7
        OTYPE = 4
        FVAL = .005
        DVAL$ = "OPEN"
```

APPENDIX I-continued

```
        DTYPE$ = "SWITCH"
CASE 3000 TO 50000
        IF AST <> 2 THEN ERRFG = 1
        ACT = 2
        OTYPE = 2
        FVAL = 1
        FIO = FI
        DTYPE$ = "VOLTAGE OUTPUT 1-10V Range"
        DVAL$ = STR$(CLNG(FVAL * 1000)/1000) + "Volts"
CASE 680 TO 1510
        IF AST <>8 THEN ERRFG = 1
        ACT = 8
        OTYPE = 4
        FVAL = .0001
        DVAL$ = STR$(FNFTEMP) + CHR$(248) + "F"
        DTYPE$ = "RTD TEMPERATURE ELEMENT"
CASE 495 TO 680
        ACT = 4
        OTYPE = 4
        DVAL$ = STR$(FVAL * 1000) + "ma."
        DTYPE$ = "4 TO 20 ma. LOOP (driven)"
CASE 405 TO 495
        FRON = -12
        FRION = FRON/FZ
        FRSS = .5
        FRISS = FRSS/FZ
        OTYPE = 6
        ACT = 6
        CALL TSTLATCH(ACT, FRON, FROFF, FRIOFF, RTYPE$)
        FVAL = FROFF
        OTYPE = 6
        DVAL$ = "OFF"
        DTYPE$ = "12V RELAY" + RTYPE$
CASE 180 TO 250
        FRON = 12
        FRION = FRON/FZ
        FRSS = .5
        FRISS = FRSS/FZ
        OTYPE = 6
        ACT = 5
        CALL TSTLATCH(ACT, FRON, FROFF, FRIOFF, RTYPE$)
        FVAL = FROFF
        DVAL$ = "OFF"
        DTYPE$ = "12V RELAY" + RTYPE$
CASE 108 TO 180
        FRON = 5
        FRION = FRON/FZ
        FRSS = .5
        FRISS = FRSS/FZ
        OTYPE = 6
        ACT = 6
        CALL TSTLATCH(ACT, FRON, FROFF, FRIOFF, RTYPE$)
        FVAL = FROFF
        DVAL$ = "OFF"
        DTYPE$ = "5V RELAY" + RTYPE$
CASE 73 TO 89
        FRON = -6
        FRION = FRON/FZ
        FRSS = .5
        FRISS = FRSS/FZ
        OTYPE = 2
        ACT = 6
        CALL TSTLATCH(ACT, FRON, FROFF, FRIOFF, RTYPE$)
        FVAL = FROFF
        DVAL$ = "OFF"
        DTYPE$= "6V RELAY" + RTYPE$
CASE 25 TO 35
        FRON = 6
        FRION = FRON/FZ
        FRSS = .5
        FRISS = FRSS/FZ
        ACT = 5
        OTYPE = 6
        CALL TSTLATCH(ACT, FRON, FROFF, FRIOFF, RTYPE$)
        FVAL = FROFF
        DVAL$ = "OFF"
        DTYPE$ = "6V RELAY" + RTYPE$
CASE 0 TO 10
        IF AST<>7 THEN ERRFG = 1
        ACT = 7
        DVAL$ = "CLOSED"
        DTYPE$ = "SWITCH"
```

APPENDIX I-continued

```
CASE ELSE
    ACT = 0
    DVAL$ = STR$(FZ) + "OHMS"
    DTYPE$ = "NOT A VALID I/O TYPE"
END SELECT
IF ERRFG = 1 THEN COMNT$ = "LOAD INCONSISTANT-TYPE
ASSUMED"
    CALL DISPLAY(COMNT$, DVAL$, DTYPE$)
    GOTO OPERATE
```

I claim:

1. In a data acquisition system including a plurality of input devices and a plurality of output devices, signal processing means operable in a data acquisition mode for monitoring the input devices and controlling the output devices, and a plurality of interface circuits interposed between said input and output devices and said signal processing means for interfacing said devices with said signal processing means, each of said interface circuits comprising:

conditioning circuit means having an input circuit with at least one of said devices being connected to said input circuit, said conditioning circuit means including drive circuit means coupled to said input circuit for providing a drive signal for said connected device, current monitoring means coupled to said input circuit for providing a signal indicative of the current flowing through said connected device, and voltage monitoring means for providing a signal indicative of the voltage across said connected device, said signal processing means being programmed to be operable in a configuring mode to control said drive circuit means to vary the drive signal to thereby vary at least one of the current flowing through said connected device and the voltage across said connected device, and said signal processing means processing the signals provided by said current monitoring means and said voltage monitoring means as the current through and the voltage across said connected device are varied to determine whether said connected device is an input or an output type device and to configure said conditioning circuit means as a function of the type of device connected thereto, said signal processing means identifying said connected device as an input type device when, in the absence of a drive signal, said voltage monitoring means provides a signal and as an output type device when said voltage monitoring means fails to provide a signal, and said signal processing means configuring said conditioning circuit means to enable a connected device that is identified as an input type device to be monitored while said signal processing means is operating in said data acquisition mode, and to enable a connected device that is identified as an output type to be controlled by drive signals provided by said drive circuit means while said signal processing means is operating in said data acquisition mode.

2. The system according to claim 1, wherein said signal processing means, when operating in said configuring mode, and after said connected device has been identified as being an input type device, is programmed to control said drive circuit means to vary the drive signal for said connected device, by causing a signal proportional to current flowing through said connected device to be applied to an input of said drive circuit means while the voltage across said connected device is monitored by said voltage monitoring means, and by causing a signal proportional to the voltage across said connected device to be applied to said input of said drive circuit means while the current flowing through said connected device is monitored by said current monitoring means, said signal processing means comparing the signals produced by said voltage monitoring means and said current monitoring means with reference values to determine whether the connected device is, an externally sourced voltage type device or externally sourced current type device, respectively.

3. The system according to claim 2, wherein said drive circuit means includes a differential amplifier having an inverting input, a non-inverting input and an output, and switchable feedback circuit means connected to said inverting input of said differential amplifier, said non-inverting input of said differential amplifier being connected to receive a signal provided by said signal processing means, and circuit means connecting said output of said differential to said input circuit; said switchable feedback circuit means being controlled by said signal processing means to be operable in a first mode to feed back to said inverting input of said differential amplifier a current that is proportional to the current flowing through said connected device and said switchable feedback circuit means being controlled by said signal processing means to be operable in a second mode to feed back to said inverting input of said differential amplifier a voltage that is proportional to the sensed voltage.

4. The system according to claim 3, wherein said circuit means includes a low impedance circuit device connected in a series circuit path between said output of said differential amplifier and said connected device, said current monitoring means including an amplifier circuit having an input and an output, said input of said amplifier circuit being connected to said low impedance circuit device for producing at said output of said amplifier circuit a signal that is proportional to current flowing through said connected device.

5. The system according to claim 4, wherein said amplifier circuit is connected to measure the voltage across said low impedance circuit device in producing said signal corresponding to the current flowing through said connected device.

6. The system according to claim 4, wherein said input circuit includes a sensing terminal, an output terminal and a reference terminal, said connected device being connected to said output terminal, said reference terminal being connected to a point of reference potential, and said voltage monitoring means including means for coupling said sensing terminal to said signal processing means, and wherein said voltage monitoring means monitors the potential at said sensing terminal relative to said reference terminal.

7. The system according to claim 6, wherein the presence of a potential difference between said output terminal and said sensing terminal that is a fraction of the potential difference between said first and third terminals is indicative that said connected device is a potentiometer.

8. The system according to claim 3, wherein said signal processing means controls said drive circuit means to establish a fixed current through said connected device whereby the voltage across said connected device is indicative of the resistance of said connected device.

9. The system according to claim 3, wherein said switchable feedback circuit means has a first input coupled to said output of said current monitoring means, a second input coupled to said input circuit, an output coupled to said inverting input of said differential amplifier, and switching means controlled by said signal processing means to connect said input circuit to said inverting input of said differential amplifier when said feedback circuit means in operating in said first mode, and to connect said output of said current monitoring means to said inverting input of said differential amplifier when said feedback circuit means is operating in said second mode.

10. An interface circuit for coupling a plurality of input and output devices to a signal processing means, said interface circuit comprising:
  conditioning circuit means having an input circuit adapted for connecting at least one of said devices to said interface circuit;
  said conditioning circuit means including drive circuit means having an output coupled to said input circuit for providing a drive signal for said one device, current monitoring means coupled to said input circuit for providing a signal indicative of the current flowing through said one device, and voltage monitoring means for providing a signal indicative of the voltage across said one device;
  said drive circuit means including a differential amplifier having feedback circuit means including switching means, said switching means being controlled by said signal processing means in a first mode to feed back to said first input of said differential amplifier a current that is proportional to the current flowing through said one device and operable in a second mode to feed back to said first input of said differential amplifier means a voltage that is proportional to the across said one device, to permit said conditioning circuit to be configured as a function of whether said one device is an input type device or an output type device, enabling the drive signal produced by said drive circuit means to be selected as a function of whether said one device is an input type device or an output type device.

11. The interface circuit according to claim 10, wherein said drive circuit means is controllable to vary the drive signal for said one device in a predetermined manner, whereby the values of the current flowing through and the voltage across said one device permit determining whether said one device is internally sourced or externally sourced.

12. The interface circuit according to claim 11, wherein said feedback circuit means has a first input coupled to said output of said current monitoring means, a second input coupled to said input circuit, an output coupled to said inverting input of said differential amplifier, said switching means being controlled by said signal processing means to connect said input circuit to said inverting input of said differential amplifier when said feedback circuit means in operating in said first mode, and to connect said output of said current monitoring means to said inverting input of said differential amplifier when said feedback circuit means is operating in said second mode.

13. The interface circuit according to claim 12, wherein said drive circuit means is adapted to establish a fixed current through said one device whereby the voltage across said one device is indicative of the resistance of said one device.

14. The system according to claim 10, wherein said current monitoring means includes a low impedance circuit device and an amplifier circuit, said circuit device being connected in a series circuit path between said output of said differential amplifier and said one device, and said amplifier circuit having an input and an output, said input of said amplifier circuit being connected to said low impedance circuit device for producing at said output of said amplifier circuit a signal that is proportional to current flowing through said one device.

15. The interface circuit according to claim 14, wherein said amplifier circuit is connected to measure the voltage across said low impedance circuit device in producing said signal corresponding to the current flowing through said one device.

16. The interface circuit according to claim 14, wherein said input circuit includes a sensing terminal, an output terminal and a reference terminal, said connected device being connected to said output terminal, said reference terminal being connected to a point of reference potential, and said voltage monitoring means includes means for coupling said sensing terminal to said signal processing means, and wherein said voltage monitoring means monitors the potential at said sensing terminal relative to said reference terminal.

17. In a data acquisition system including a plurality of input devices, a plurality of output devices, signal processing means operable in a data acquisition mode for monitoring the input devices and controlling the output devices, and interface circuit means interposed between the input and output devices and the signal processing means for interfacing the input and output devices with the signal processing means, a method of determining the types of device connected to the input of the interface circuit means comprising the steps of:
  causing said signal processing means to control a drive circuit means of said interface circuit means to vary the current flowing through said connected device and the voltage across said connected device in a predetermined sequence;
  monitoring at least one of the current flowing through the connected device and the voltage across said connected device while the current flowing through said connected device and the voltage across said connected device are being varied;
  using the current and voltage values measured to determined whether said connected device is an input or output type device, including identifying said connected device as an input type device when, in the absence of a drive signal, said voltage monitoring means provides a signal and as an output type device when said voltage monitoring means provides a signal, and causing said signal processing means to configure said conditioning circuit as a function of the type of device connected thereto, including causing said signal processing means to configure said conditioning circuit means to enable a connected device that is identified as an input type device to be monitored while said signal processing means is operating in said data acquisition mode, and to enable a connected device that is identified as an output type device said drive circuit means to be controlled by drive signals provided by said drive circuit means while said signal processing means is operating in said data acquisition mode.

18. The method according to claim 17, including causing said signal processing means to control said drive circuit means to vary the drive signal for said connected device in a predetermined manner, whereby the values of current and voltage measured by said current and voltage monitoring means are indicative of whether said connected device is internally sourced or externally sourced.

19. The method according to claim 18, wherein controlling the drive circuit means includes the step of feeding back a current proportional to the current flowing through said connected device to an input of said drive circuit means and measuring the voltage across said connected device, and the step of feeding back a voltage proportional to the voltage across said connected device and measuring the current flowing through said connected device.

20. The method according to claim 18, including the steps of establishing a fixed current through said connected device, whereby the voltage across the connected device is indicative of the resistance of said connected device, and correlating the resistance of said connected device that is indicated by said voltage with resistance values indicative of particular types of devices for identifying the connected device as a particular type of device.

21. The method according to claim 18, wherein the connected device is a relay, and including controlling the drive circuit means to provide a drive signal that ramps up to a predetermined value for causing the relay to operate, causing the drive signal to ramp down for deenergizing the relay to allow the relay to release, and observing the polarity required to release the relay, the polarity required to release the relay indicating whether the relay is a momentary relay or a latching relay.

* * * * *

UNITED STATES PATENT AND TRADEMARK OFFICE
CERTIFICATE OF CORRECTION

PATENT NO. : 5,444,644
DATED : August 22, 1995
INVENTOR(S) : August A. Divjak

It is certified that error appears in the above-indentified patent and that said Letters Patent is hereby corrected as shown below:

Column 14, line 23, claim 2, delete ",".

Column 14, line 38, claim 3, after "device" insert --,--.

Column 16, line 68, claim 17, "provides" should be --fails to provide--.

Signed and Sealed this

Tenth Day of September, 1996

Attest:

BRUCE LEHMAN

*Attesting Officer*   *Commissioner of Patents and Trademarks*